United States Patent
Konishi

[11] Patent Number: 6,049,065
[45] Date of Patent: Apr. 11, 2000

[54] CERAMIC HEATER, A METHOD OF MAKING THE SAME AND A CERAMIC GLOW PLUG HAVING THE CERAMIC HEATER

[75] Inventor: Masahiro Konishi, Aichi-ken, Japan

[73] Assignee: NGK Spark Plug Co., Ltd., Aichi-Ken, Japan

[21] Appl. No.: 09/064,612

[22] Filed: Apr. 23, 1998

[30] Foreign Application Priority Data

Apr. 23, 1997 [JP] Japan ..................... 9-105740
Apr. 9, 1998 [JP] Japan ................... 10-097831

[51] Int. Cl.⁷ ...................................... F23Q 7/22
[52] U.S. Cl. .................. 219/270; 219/553; 501/96.3; 501/97.2; 501/97.4
[58] Field of Search ................. 219/270, 552, 219/553, 544, 548, 505; 338/226; 29/611; 501/97.1, 97.2, 97.3, 97.4

[56] References Cited

U.S. PATENT DOCUMENTS

| | | | |
|---|---|---|---|
| 4,407,971 | 10/1983 | Komatsu et al. | 501/96.3 |
| 4,612,296 | 9/1986 | Sakamoto et al. | 501/93 |
| 4,633,064 | 12/1986 | Atsumi et al. | 219/270 |
| 4,634,837 | 1/1987 | Ito et al. | 219/270 |
| 4,644,133 | 2/1987 | Atsumi et al. | |
| 4,814,581 | 3/1989 | Nunogaki et al. | 219/270 |
| 4,983,554 | 1/1991 | Hsieh | 501/97 |
| 5,064,789 | 11/1991 | Petrovic et al. | 501/96.3 |
| 5,085,804 | 2/1992 | Washburn | 252/516 |
| 5,178,647 | 1/1993 | Komatsu et al. | 51/307 |
| 5,233,166 | 8/1993 | Maeda et al. | 219/552 |
| 5,304,778 | 4/1994 | Dasgupta et al. | |
| 5,429,997 | 7/1995 | Hebsur | 501/96.3 |

FOREIGN PATENT DOCUMENTS

| | | |
|---|---|---|
| 3512483 | 10/1985 | Germany . |
| 3519437 | 12/1985 | Germany . |
| 6-251862 | 9/1994 | Japan ........ H05B 3/18 |

OTHER PUBLICATIONS

Japanese Patents Gazette, week 8513, Derwent Publications Ltd., London, GB; AN 85076746, Feb. 13, 1985.

Primary Examiner—Philip H. Leung
Assistant Examiner—Vinod D. Patel
Attorney, Agent, or Firm—Sughrue, Mion, Zinn, Macpeak & Seas, PLLC

[57] ABSTRACT

In a ceramic heater a heating element is embedded in a basal ceramic body which is prepared with silicon nitride as a main constituent. $MoSi_2$ particles are dispersed throughout the basal ceramic body. The $MoSi_2$ particles have a granular diameter ranging from 0.1 μm up to but not including 3.0 μm. The $MoSi_2$ particles range from 1.0% to 5.0% by weight.

19 Claims, 10 Drawing Sheets

Crystallized particle represented by void

CERAMIC HEATER, A METHOD OF MAKING THE SAME AND A CERAMIC GLOW PLUG HAVING THE CERAMIC HEATER

BACKGROUND OF THE INVENTION

1. Field of the Invention

The invention relates to a ceramic heater well-suited for a ceramic glow plug incorporated into a diesel engine.

2. Description of Prior Art

In a prior art ceramic heater disclosed by provisionally published Japanese Patent Application No. 6-251862, there is provided a ceramic body sintered with silicon nitride as a main material. $MoSi_2$ particles (mean granular diameter: 3~25 μm), a thermal coefficient of expansion of which is greater than that of the main material, are dispersed in the main material to contain 3~25% by weight. This ameliorates the oxidation resistant property so as to improve the endurance ability which is represented by duration until a heater resistor is disconnected to cease the heat generation due to repetitive heating and cooling cycles.

Upon checking the performance of the ceramic heater, the ceramic heater has been mounted on a glow plug to carry out an endurance experimental test by repeatedly energizing and deenergizing the ceramic heater. As a result, it has been found that cracks may occur on the silicon nitride-based ceramic body even though the heater resistor is not disconnected.

The reason why the cracks occur is considered as follows:

Due to the greater thermal coefficient of expansion of $MoSi_2$ compared to that of the silicon nitride-based ceramic body surrounding the $MoSi_2$ particles, thermal stress occurs when subjecting to the sintering process and the repetitive heating and cooling cycles. Depending on the granular diameter of the $MoSi_2$ particles, the thermal stress often increases more than the silicon nitride-based ceramic body can endure in the context of physical strength, as exemplified by a glow plug which is rapidly heated and cooled repeatedly during operation.

Therefore, it is a main object of the invention to provide a ceramic heater which is capable of enduring the repetitive energization and deenergization for an extended period of time without inviting cracks on the silicon nitride-based ceramic body.

SUMMARY OF THE INVENTION

According to the present invention, the invention is made based on the necessity of appropriately adjusting the granular diameter of $MoSi_2$ particles when adding the $MoSi_2$ particles to a silicon nitride-based ceramic body in order to moderate the thermal coefficient of expansion of a heater which is to be embedded in the silicon nitride-based ceramic body.

When the granular diameter of $MoSi_2$ particles is dispersed in the silicon nitride-based ceramic body in the range from 0.1 to 3.0 μm by a cross sectional texture observation, it is found that the physical strength of the silicon nitride-based ceramic body exceeds the thermal stress which occurs at the time of subjecting to the sintering process and energization heat due to the thermal expansional difference between $MoSi_2$ and the silicon nitride-based ceramic body. This makes it possible to mitigate the thermal stress-related cracks on the silicon nitride-based ceramic body when subjecting to the repetitive heating and cooling cycles during alternately energizing and deenergizing the heater.

That is, the difference in terms of a mean thermal coefficient of expansion appears at an ambient phase between the $MoSi_2$ particles and the silicon nitride-based ceramic body surrounding the $MoSi_2$ particles. This induces the thermal stress at a boundary between the ambient phase and the $MoSi_2$ particles, the stress of which is likely to increase with the increase of the granular size of the $MoSi_2$ particles. When the granular size of the $MoSi_2$ particles exceeds a certain level, it is conceived that the cracks are likely to occur on the silicon nitride-based ceramic body due to the thermal stress thus induced. However, by adjusting the granular diameter of the $MoSi_2$ particles to be 3.0 μm or less, it is possible to moderate the thermal stress so as to endure the repetitive energization and deenergization for an extended period of time without inviting the cracks or rupture on the silicon nitride-based ceramic body.

Upon decreasing the granular diameter of the $MoSi_2$ particles to be less than 0.1 μm, it is uncertain to ameliorate the physical strength of the silicon nitride-based ceramic body still more although it increases the material cost. This also makes the $MoSi_2$ particles coagulate each other to form granular growth lumps which are unevenly distributed in the silicon nitride-based ceramic body after the end of the sintering process. In addition, the $MoSi_2$ particles thus ground fine, exceedingly drops its ignitable point low enough to invite a hazard.

Upon defining the granular diameter, attention is drawn to FIG. 14 in which a crystallized particle and parallel lines A, B are delineated. The granular diameter is expressed by a minimum value (d) between the parallel lines A, B obtained when moving the parallel lines A, B relative to the crystallized particle while always keeping the lines A, B in contact with an outer surface of the crystallized particle.

It is preferable that the granular diameter of the $MoSi_2$ particles is in the range from 1.0 to 2.5 μm. This is because the three-point bending strength is likely to reduce at normal temperature when the granular diameter exceeds 2.5 μm, and on the other hand, the $MoSi_2$ particles reduces its ignitable point which needs a special care to handle them when the granular diameter decreases to be less than 1.0 μm.

It is assumed that the three-point bending strength likely reduces as the granular diameter of the $MoSi_2$ particles increases because unsatisfactorily sintered portions appear around the $MoSi_2$ particles in the silicon nitride-based ceramic body due to the existing $MoSi_2$ particles which act as foreign matter not contributing to sintering the silicon nitride-based ceramic body.

When the granular diameter of the $MoSi_2$ particles exceed 2.5 μm, the physical strength reduces unacceptably as a product of a ceramic heater with a safety factor taken into consideration. This is a reason why the granular diameter of the $MoSi_2$ particles is 2.5 μm or less.

On the other hand, it is necessary to previously decrease the granular diameter of the $MoSi_2$ particles as a raw material in order to have moderated that of the $MoSi_2$ particles after sintering the silicon nitride-based ceramic body. However, it is preferable that the granular diameter of the $MoSi_2$ particles is 1.0 μm or more as a raw material in view of the self-inflammable property of the $MoSi_2$ particles which is strengthened with the decrease of the granular diameter of the $MoSi_2$ particles.

The $MoSi_2$ particles, which are added to adjust the expansional difference, are likely oxidized to change into an oxide compound when heated to approx. 400~500° C. in an atmospheric environment. The oxide compound, thus produced, is likely to evaporate or sublime at approx. 700

~800° C. which is a temperature considerably lower than the operating temperature of the ceramic heater. When the oxide compound evaporates or sublimates during the operation to such a degree as to establish an unacceptable number of minute pores within the silicon nitride-based ceramic body by increasing an amount of $MoSi_2$ particles, it is conceivable to reduce the durabilty of the ceramic heater.

In order to avoid these inconveniences, it is possible to diminish the thermal expansional difference between the $MoSi_2$ particles and the ambient phase so as to relieve a stress concentration by containing the $MoSi_2$ particles in the range from 1.0 to 5.0% by weight. This also reduces the formation of the $MoSi_2$-related oxide so as to mitigate the deterioration of the durability accompanied by the formation of the minute pores.

In addition to the reduced amount of the $MoSi_2$ particles, the reason lies that the diminished granular diameter of the $MoSi_2$ particles makes it possible to disperse the $MoSi_2$ particles with the $MoSi_2$ particles surrounded by the ambient phase. This produces chances to isolate the $MoSi_2$ particles from the contact with the oxygen component. The addition of the $MoSi_2$ particles in this range does not affect significantly on the capability of sintering the basal ceramic body, thus obviating the necessity of increasing and subtly adjusting the amount of the sintering aid. In order to strengthen these advantages, it is preferable to add the $MoSi_2$ particles in the range from 3.0 to 4.0% by weight.

When the added amount of the $MoSi_2$ particles is short of 1.0% by weight, the thermal expansional difference becomes unacceptably greater between the basal ceramic body and the heating element embedded in the basal ceramic body, the stress concentration occurs in the basal ceramic body so as to reduce the durabilty of the ceramic heater. In this instance, the added amount of the $MoSi_2$ particles can be specified with the use of ICP luminescence analysis.

With the heating element prepared mainly by silicide, carbide or nitride of one or more metals selected from the group consisting of W, Ta, Nb, Ti, Zr, Hf, V, Mo and Cr, it is possible to produce a chemically stable heater with a greater positive resistor-temperature coefficent which advantageously embodies a quick temperature rise type glow plug.

In order to permit a greater amount of current flow and a quicker temperature rise at an early time of the energization, it is preferable to adopt a resistor element as the heater which has a relatively low specific resistance (Ro) at room temperature. In more concrete terms, the specific resistance (Ro) of the resistor element may be preferably $1.0 \times 10^{-3}$ Ω cm or less.

In addition to the resistor-temperature coefficient ($\delta$) and the specific resistance (Ro), the resistor element of the heater is selected with the thermal coefficient of expansion ($\rho$) and melting point (Tm) taken into account. From the reason that it becomes difficult to insure the good endurance against the repetitive energization and deenergization for an extended period of time if the thermal coefficient of expansion ($\rho$) of the resistor element is greatly different from that of the basal ceramic body, it is preferable to determine the difference ($\rho 1-\rho 2$) to be within $10.0 \times 10^{-6}/°$ C. Where $\rho 1$ represents the thermal coefficient of expansion of the main element of the heater, and $\rho 2$ indicates the thermal coefficient of expansion of the silicon nitride-based ceramic body. The resistor element may be preferably selected so that the melting point (Tm) of the heater is 1500° C. or more with the practical possible temperature of the ceramic heater taken into consideration.

Among the above metal compounds, W-based carbide and Mo-based silicide can be effectively used. When the W-based based carbide and Mo-based silicide are used to the heater, it is possible to improve the durability of the heater due to the small thermal expansional difference between the W-based carbide, Mo-based silicide and silicon nitride-based ceramic body. It is also possible to impart a higher temperature zone to the heater without let and hindrance due to the high melting point (2000° C. or more) of the W-based carbide and Mo-based silicide.

In addition to the silicon nitride and a predetermined amount of the sintering aid, the heater is prepared by silicide, carbide or nitride powder of one or more metals selected from the group consisting of W, Ta, Nb, Ti, Zr, Hf, V, Mo and Cr.

As the sintering aid, oxide of the rare earth metals (e.g., $Y_2O_3$, $Er_2O_3$ and $Yb_2O_3$) and the alkaline earth metals can be selected. The heater may be prepared by the high melting point metal such as W, W—Re, Mo or the like.

Upon making a ceramic heater, $Si_3N_4$ particles and $MoSi_2$ particles are mixed with an addition of an oxide of the rare earth metal as a sintering aid in order to prepare a basal ceramic body.

In this instance, the granular diameter of the $MoSi_2$ particles ranges from 0.1 to 3.0 $\mu$m and ranging from 1.0 to 5.0% by weight contained in a mixture of the $Si_3N_4$ particles, $MoSi_2$ particles and the oxide of the rare earth metal. Then, the basal ceramic body is sintered by means of hot press procedure in which a heater is embedded.

This makes it possible to set the physical strength of the silicon nitride-based ceramic body more than the thermal stress which occurs when subjecting to the sintering process and energization of the heater due to the thermal expansional difference between $MoSi_2$ and the silicon nitride-based ceramic body. This mitigates the thermal stress-related cracks on the silicon nitride-based ceramic body when subjecting to the repetitive heat and cool cycles during alternately energizing and deenergizing the heater.

Namely, the difference in terms of a mean thermal coefficient of expansion appears at an ambient phase between the $MoSi_2$ particles and the silicon nitride-based ceramic body surrounding the $MoSi_2$ particles. This induces the thermal stress at a boundary between the ambient phase and the $MoSi_2$ particles, the stress of which tends to gain with the increase of the granular size of the $MoSi_2$ particles. When the granular size of the $MoSi_2$ particles exceeds a certain level, it is conceived that the cracks likely occur on the silicon nitride-based ceramic body due to the thermal stress thus induced. However, the adjusted granular diameter of the $MoSi_2$ particles of 3.0 $\mu$m or less, moderates the thermal stress so as to endure the repetitive energization and deenergization for an extended period of time without let and hindrance.

Upon preparing the granular diameter of the $MoSi_2$ particles to be short of 0.1 $\mu$m, it is doubtful to improve the physical strength of the silicon nitride-based ceramic body still more although it invites a hike of material cost. This also makes the $MoSi_2$ particles coagulate each other to form granular growth lumps which are unevenly distributed in the silicon nitride-based ceramic body after the end of the sintering process. The $MoSi_2$ particles thus rendered fine, exceedingly drops its ignitable point low enough to invite a hazard.

It is preferable that the granular diameter of the $MoSi_2$ particles is in the range from 1.0 to 2.5 $\mu$m. This is because the three-point bending strength likely reduces at normal temperature when the granular diameter exceeds 2.5 µm, and the ignitable point of the $MoSi_2$ particles reduces so as to require a special care to handle them when the granular diameter decreases to be less than 1.0 µm.

It is assumed that the three-point bending strength likely drops with the increase of the granular diameter of the $MoSi_2$ particles because unsatisfactorily sintered portions appear around the $MoSi_2$ particles under the presence of the $MoSi_2$ particles as foreign matter which does not contribute to sintering the silicon nitride-based ceramic body.

When the granular diameter of the $MoSi_2$ particles exceed 2.5 µm, the physical strength drops to an unacceptable degree as a ceramic heater with a safety factor taken into consideration. This is a reason why the granular diameter of the $MoSi_2$ particles is 2.5 µm or less. On the other hand, it is necessary to previously decrease the granular diameter of the $MoSi_2$ particles as a raw material in order to have moderated that of the $MoSi_2$ particles after sintering the silicon nitride-based ceramic body. However, it is preferable that the granular diameter of the $MoSi_2$ particles is 1.0 µm or more as a raw material when considering self-inflammable property of the $MoSi_2$ particles which would be reinforced with the decrease of the granular diameter of the $MoSi_2$ particles (FIG. 15).

Under the environment in which the glow plug is subjected repeatedly to rapid heat and cool cycles in the diesel engine, the thermal stress alternately appears inside the heater during the operation. According to the present invention, it is possible to determine the physical strength of the silicon nitride-based ceramic body to be more than the thermal stress established due to the thermal expansional difference between $MoSi_2$ and the silicon nitride-based ceramic body when subjecting to the repetitive heat and cool cycles and energization heat. This mitigates the thermal stress-related cracks on the silicon nitride-based ceramic body.

DETAILED DESCRIPTION OF THE PREFERRED EMBODIMENTS OF THE INVENTION

Figure 1:
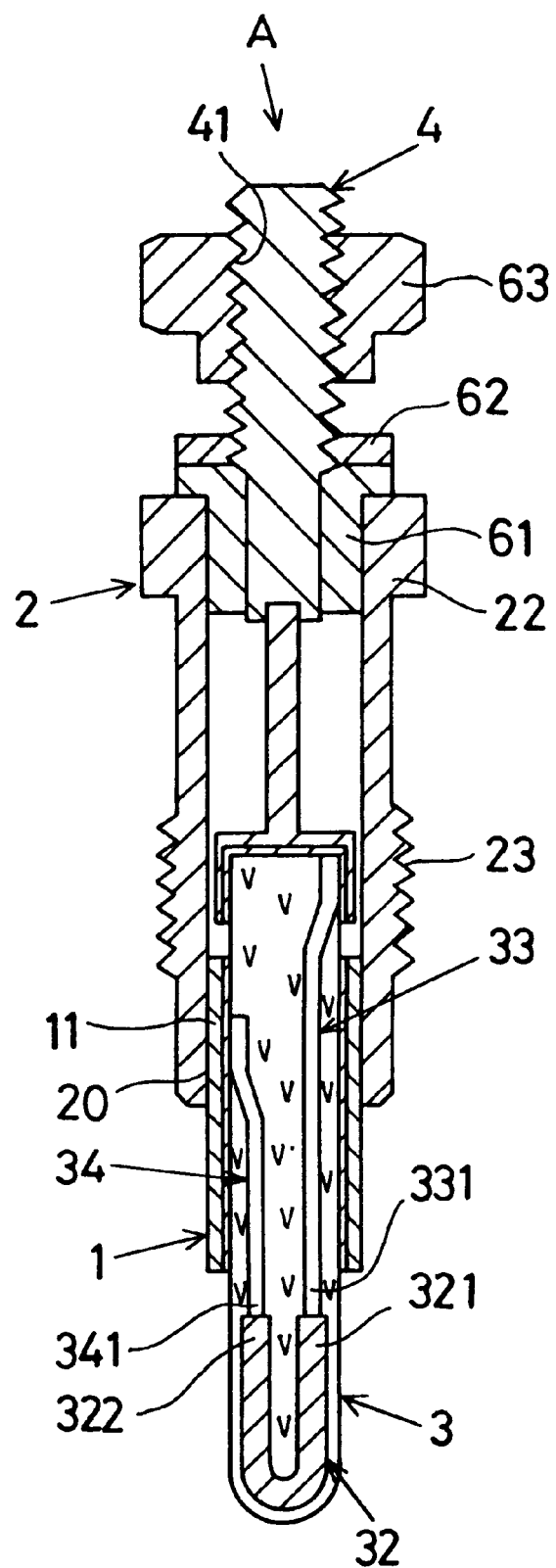
FIG. 1 is a longitudinal cross sectional view of a glow plug according to an embodiment of the invention.
Figure 2:
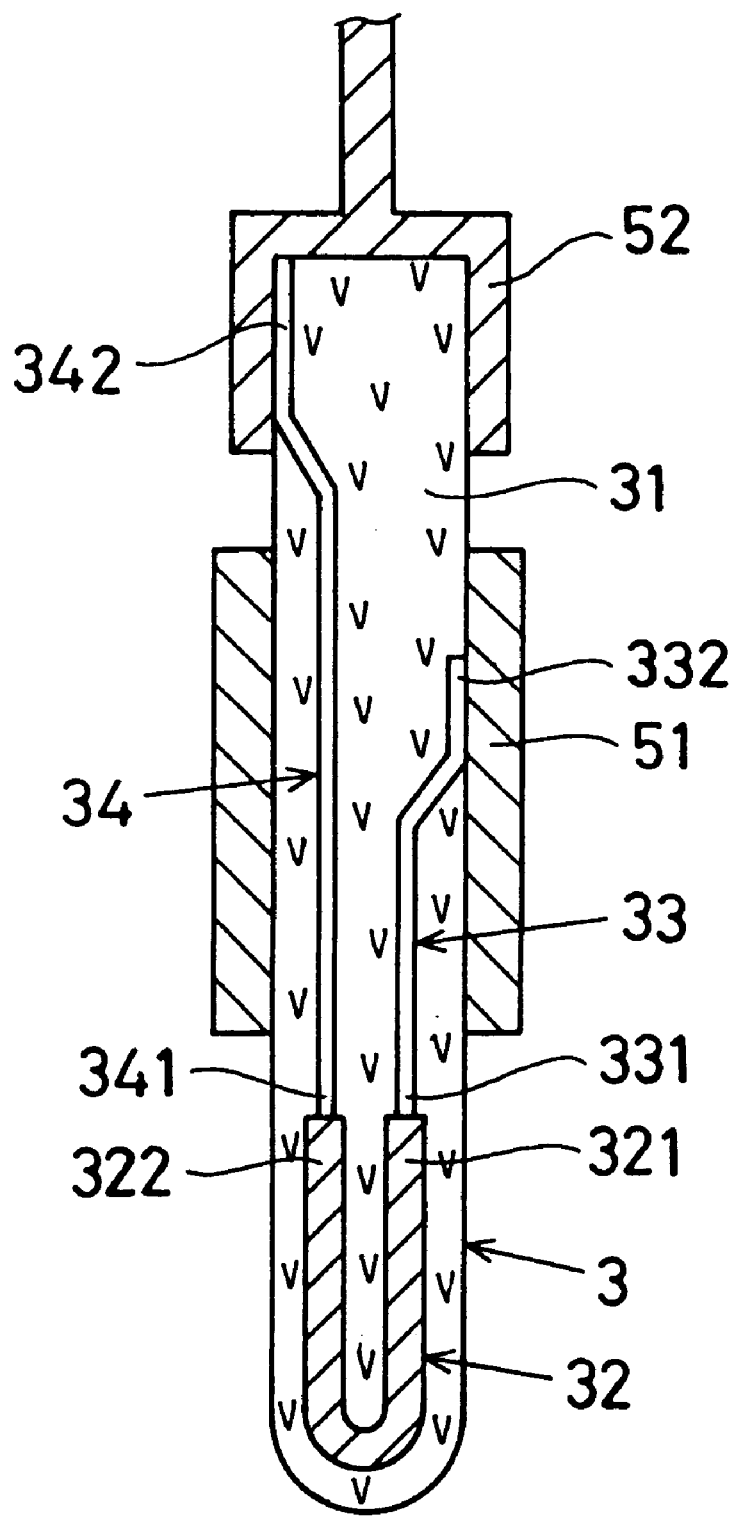
FIG. 2 is a longitudinal cross sectional view of a ceramic heater incorporated into the glow plug.

Referring to FIGS. 1 and 2, a glow plug (A) has a metal sheath 1 and a cylindrical metal shell 2 which retains a rear portion 11 of the metal sheath 1. Within the metal sheath 1, a ceramic heater 3 is provided. By way of an insulator ring 61, a terminal electrode 4 is connected to the metal shell 2 in an electrically insulating relationship with the metal shell 2.

The metal sheath 1 (0.6 mm in thickness) is made by a heat resistant alloy. The rear portion 11 of the metal sheath 1 is fixedly telescoped into a front portion 20 of the metal shell 2 by means of silver soldering. A rear section of the metal shell (carbon steel) 2 has a hex portion 22 for an entry of a wrench tool, and a front section of the metal shell 2 has a threaded portion 23 which is to be fastened to a combustion chamber of a diesel engine when mounting the glow plug (A) on the diesel engine.

The ceramic heater 3 has a $Si_3N_4$-based ceramic body 31 in which lead wires 33, 34 and a U-shaped heating element in the form of resistor 32 are embedded. An electrical resistance across the lead wires 33, 34 is designed to be approx. 750 mΩ.

The heater resistor 32 embedded in the $Si_3N_4$-based ceramic body 31 measures 0.3 mm or more in depth. When the heater resistor 32 is energized, the heater resistor 32 is adapted to heat an outer surface of the ceramic heater 3 up to 800~1300° C.

The lead wires 33, 34 are made of tungsten (W) which measures 0.3 mm in diameter. One ends 331, 341 of the lead wires 33, 34 are in turn connected to corresponding ends 321, 322 of the heater resistor 32. Other ends 332, 342 of the lead wires 33, 34 are each outcropped from the the $Si_3N_4$-based ceramic body 31 at a middle portion and a rear portion thereof.

The end 332 of the lead wire 33 is silver soldered to the metal sheath 1 to be electrically connected to the metal shell 2. The end 342 of the lead wire 34 is electrically connected to the terminal electrode 4 by way of a metal cap 52.

The terminal electrode 4 has a threaded section 41 at an outer surface thereof, and insulatedly attached to the metal shell 2 by way of the insulator ring 61 and a nut 62 which connects a feeder metal (not shown) to the terminal electrode 4.

In reference to FIGS. 3 through 13, a method of making the ceramic heater 3 (including comparative counterparts) is described as follows:

Step 1
(1) The powdered $Si_3N_4$, a sintering aid are mixed wet together with silicide, carbide or nitride of one or more metals selected from the group consisting of W, Ta, Nb, Ti, Zr, Hf, V, Mo and Cr. Take 40% $Si_3N_4$ powder by weight and 5% $Yb_2O_3$ powder by weight for example. The $Si_3N_4$ powder (mean granular diameter: 0.7 µm) and the $Yb_2O_3$ powder are added to the WC powder (mean granular diameter: 0.5 µm), and mixed wet for approx. 50 hours so as to provide slurry of mixture.

Step 2
(2) The slurry is taken and placed on a tray to desiccate it with the use of a drying chamber.

Step 3
(3) The desiccated slurry is granulated dry and screened by a sifter having a sieve opening of 250 µm (60 mesh).

Step 4
(4) To the powder thus screened, several types of binders (polyethylene, wax or the like) are added and kneaded for approx. 3 hours by means of a kneader.

Step 5
(5) The powder thus kneaded is pelletized to have a granular size of approx. 1.0 mm by a pelletizer.

Figure 3:
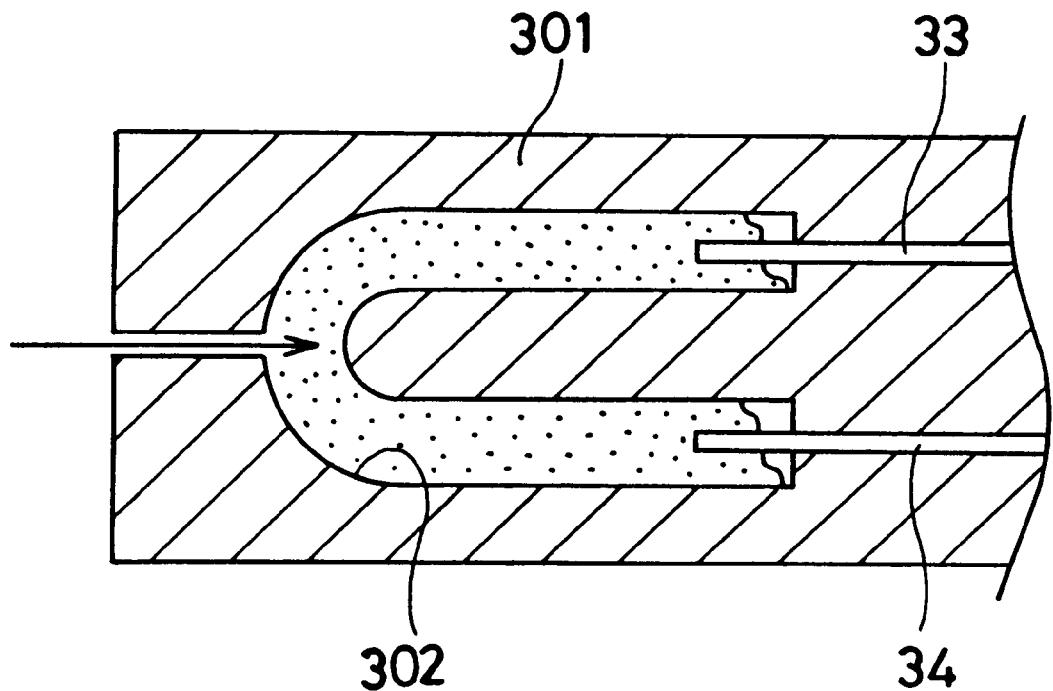
FIGS. 3 and 4 are schematic views for explaining how the ceramic heater is assembled.
Figure 4:
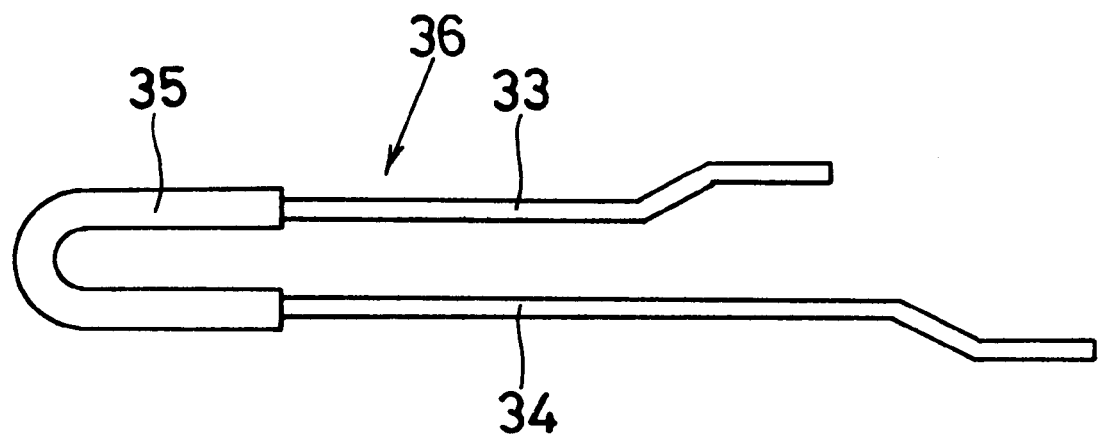

Step 6
(6) As shown in FIG. 3, there is provided an injector molder 301 which has a cavity 302 corresponding to the U-shaped heater resistor 32. The lead wires 33, 34 are placed so that each end of the lead wires 33, 34 is accommodated into the cavity 302. Then, the pellitized powder is injected into the cavity 302 to form a non-sintered heater resistor 36 which is in integral with the lead wires 33, 34 and a compacted ceramic powder 35 as shown in FIG. 4.

Step 7
(7) The $Si_3N_4$ powder and rare earth metal powder are prepared to have a mean granular diameter of 0.7 $\mu$m and 0.8~3.0 $\mu$m respectively. Then, $MoSi_2$ particles are prepared to in turn have a mean granular diameter of 0.1 $\mu$m, 0.3 $\mu$m, 0.5 $\mu$m, 1.0 $\mu$m, 2.0 $\mu$m, 3.0 $\mu$m, 3.5 $\mu$m, 4.0 $\mu$m, 6.0 $\mu$m, 8.0 $\mu$m, and 10.0 $\mu$m. The $Si_3N_4$ powder, the rare earth metal powder and the $MoSi_2$ particles are mixed wet with an addition of the binder, so as to provide powder mixtures by means of a spray dry method.

Figure 5:
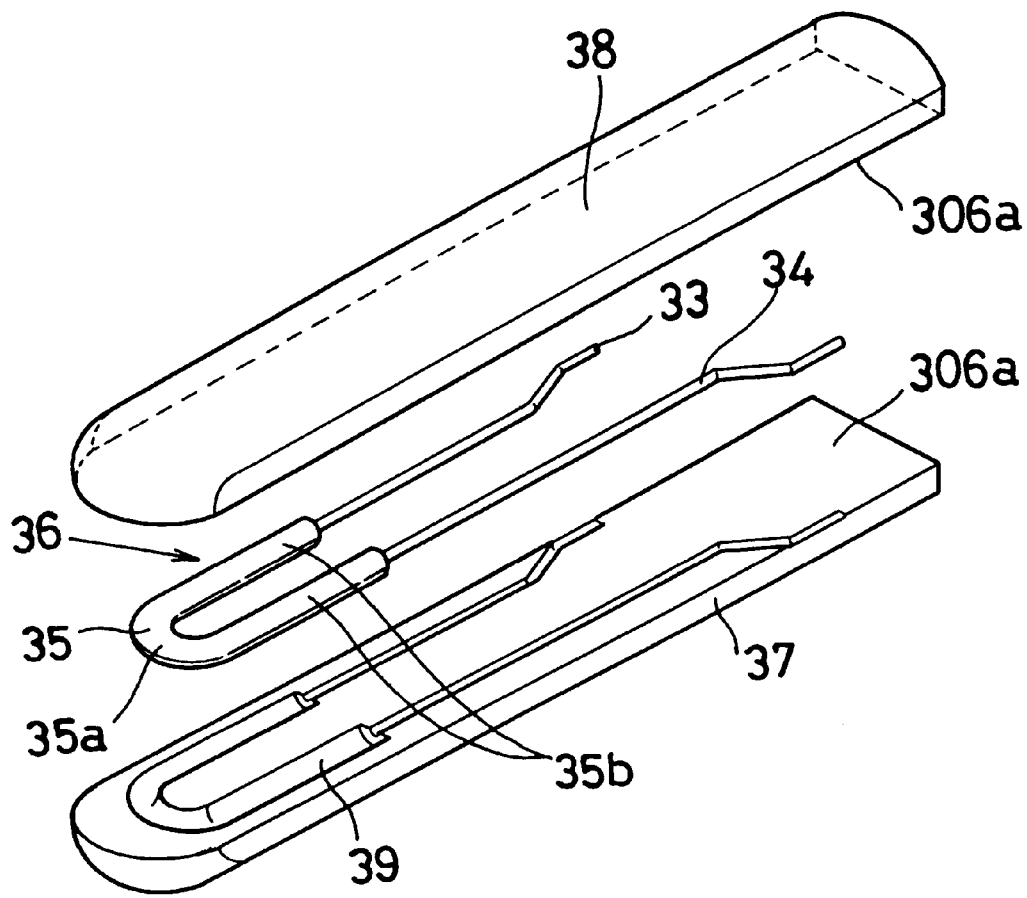
FIG. 5 is an exploded perspective view of the ceramic heater during assembling it.
Figure 6:
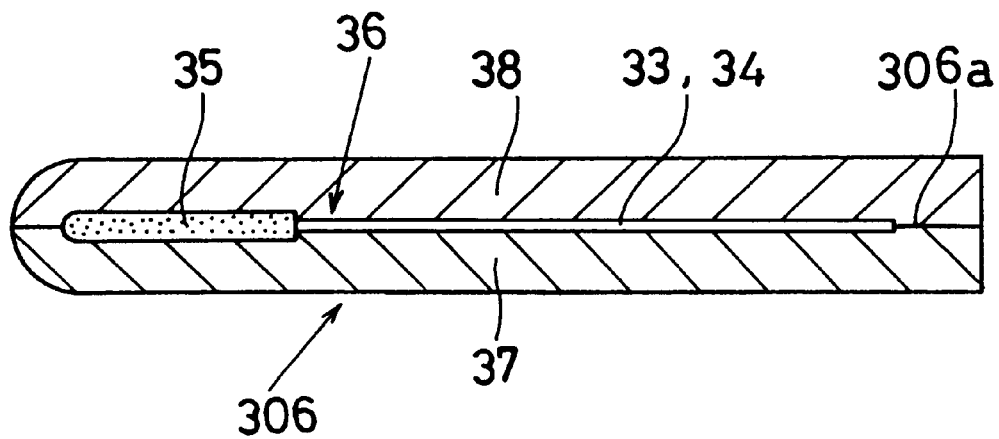
FIG. 6 is a longitudinal cross sectional view of the ceramic heater during assembling it.

Step 8
(8) The powder mixtures are pressed to form split type preform compacts 37, 38 as shown in FIGS. 5 and 6. Each of the inner sides of the split type preform compacts 37, 38 has a recess 39 at a joining surface 306a which corresponds to the non-sintered heater resistor 36.

Figure 7:
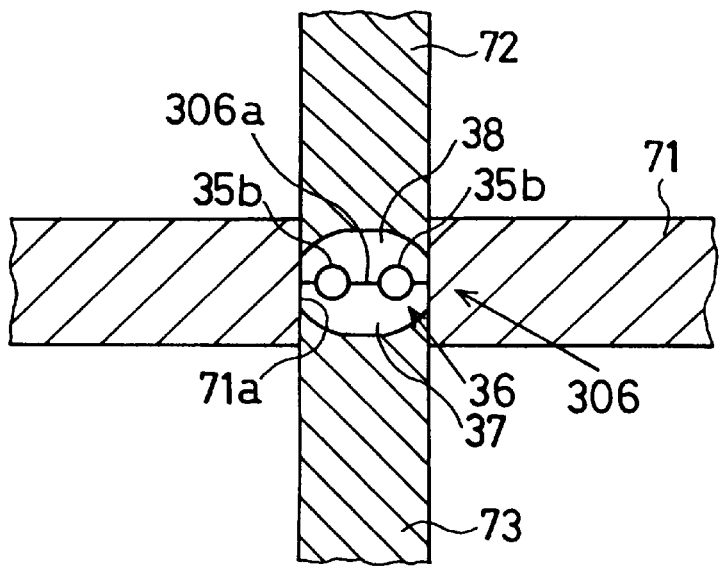
FIGS. 7 and 8 are views showing processes how the ceramic heater is treated until completed.

The non-sintered heater resistor 36 is placed within the recess 39, and then the split type preform compacts 37, 38 are clamped at the joining surface 306a with the non-sintered heater resistor 36 interposed therebetween. As shown in FIG. 7, the split type preform compacts 37, 38 thus clamped are located within a cavity 71a of a mold die 71 to be pressed by mandrel rods 72, 73 of a press machine so as to provide a composite compact body 306 in which the non-sintered heater resistor 36 and the split type preform compacts 37, 38 are integrally combined.

In this instance, the direction of the mandrel rods 72, 73 is generally in perpendicular to the joining surface 306a of the split type preform compacts 37, 38. The composite compact body 306 thus provided is heated to e.g., around 800° C. to dissipate the binder consitituent so as to form a calcined body 306' as described in FIG. 9(b) hereinafter.

Figure 8:
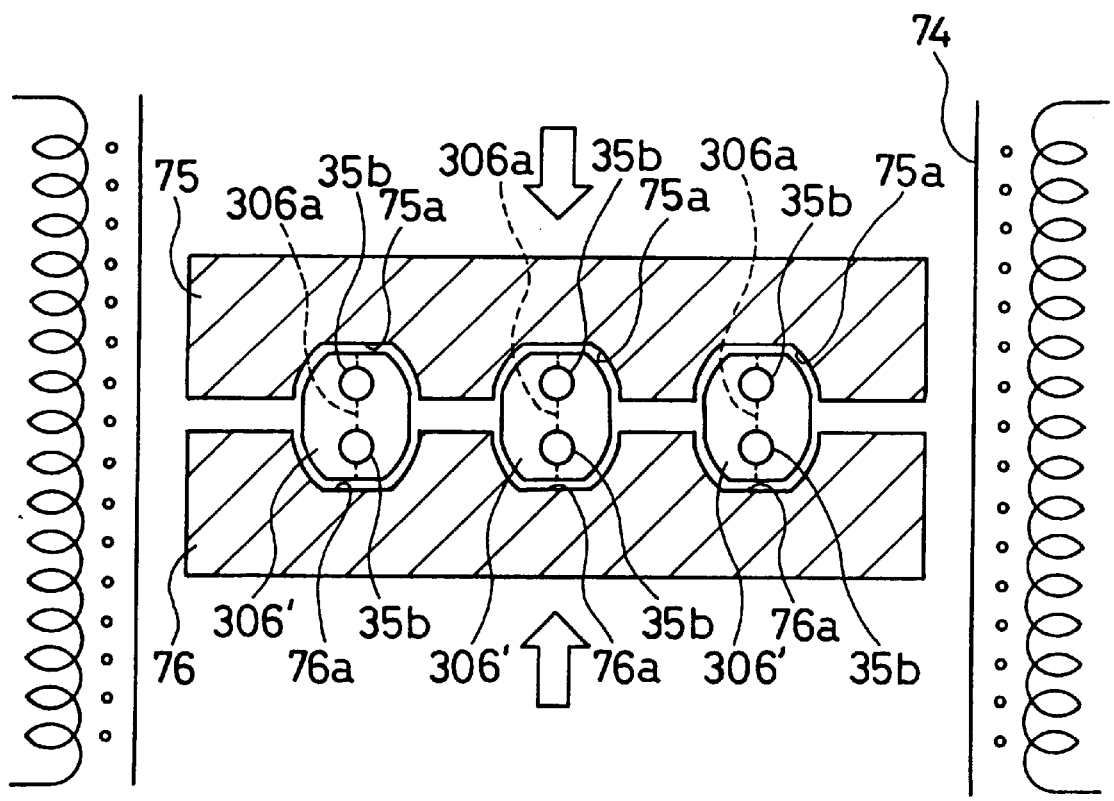
Figure 9:
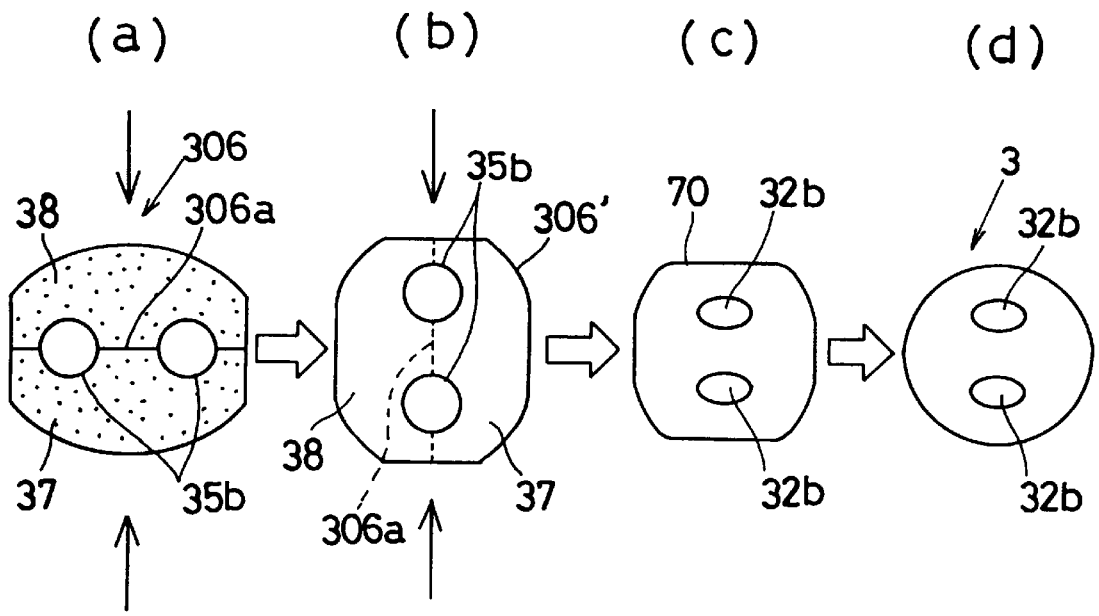
FIGS. 9(a) through 9(d) are sequential views showing how a composite compact and a sintered body change their cross section during the process of making the ceramic heater.

As shown in FIG. 8, the calcined body 306' is placed within cavities 75a, 76a of hot press molds 75, 76 made of graphite or the like. In order to provide a sintered body 70 as shown in FIG. 9(c), the calcined body 306' is placed in a furnace 74 and sintered under the pressure 300 kgf/cm² at approx. 1750° C. for about 60 minutes in a nitrogen atmosphere ($N_2$) while pressing the calcined body 306' by the hot press molds 75, 76.

Upon drawing attention to FIG. 9(b), the calcined body 306' is pressed at the joining surface 306a of the split type preform compacts 37, 38 with the pressure exerted from the dual direction. During this process, a linear section 35b of the compacted ceramic powder 35 is squelched to change into a linear portion 32b of the heater resistor 32 which forms an elliptical configuration in cross section.

Step 9
(9) As shown in FIG. 9(d), the sintered body 70 is ground into a cylindrical configuration (3.5 mm in diameter) to have a basal ceramic body circular in cross section. Then, the ceramic heater 3 is completed with the ends 332, 342 of the lead wires 33, 34 outcropped from the sintered body 70 as shown in FIG. 2.

Figure 10:
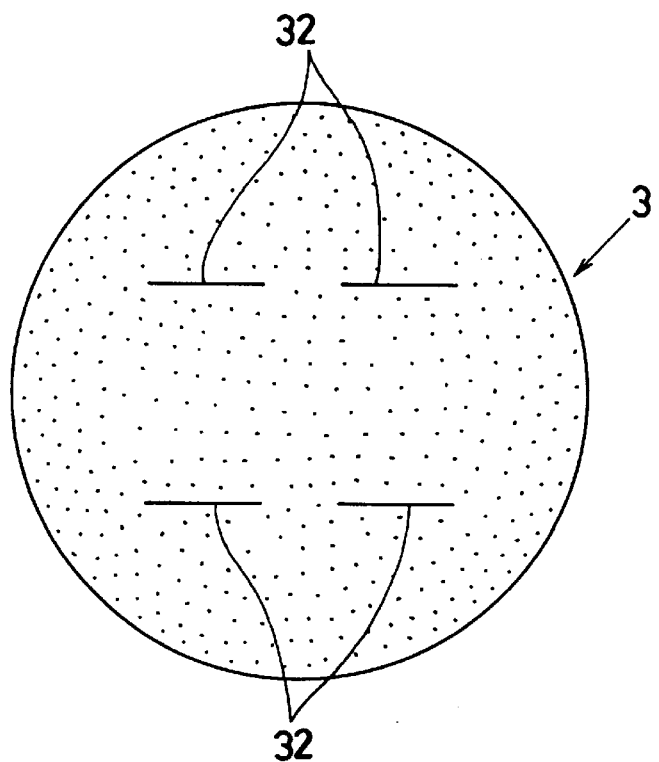
FIG. 10 is a latitudinal cross sectional view of a ceramic heater according to a modification form of the invention.

As shown in FIG. 10, an electrically conductive ceramic powder paste may be printed to a preform body along a predetermined print pattern, the preform body of which is made with silicon nitride as a main constituent. Then, the preform body is sintered together with the ceramic powder paste so as to provide the heater resistor 32.

Figure 11:
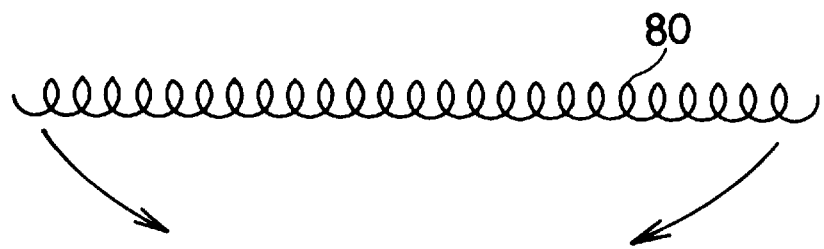
FIGS. 11, 12 and 13 are sequential views showing how a metal wire is shaped into a heater.
Figure 12:
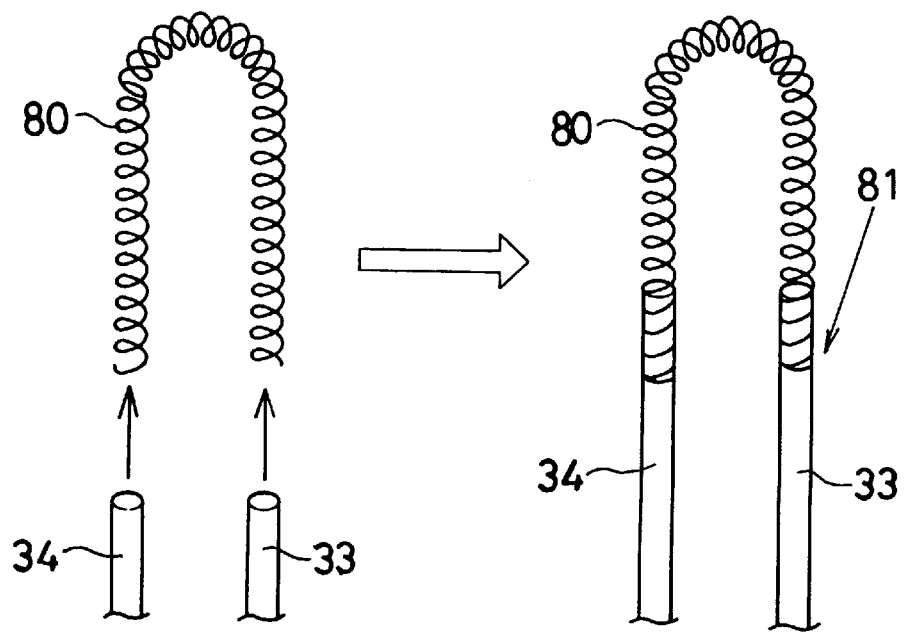

The heater resistor 32 may be a wire which is made of W, W—Re, Mo, Pt, Nb, Cr, Ni—Cr, TA or the like. This is exemplified by FIGS. 11, 12 and 13 in which a high melting point metal wire 80 is firstly formed into a helical configuration, and then is U-shaped as a whole (FIG. 11 and 12). Each leading end of the lead wires 33, 34 is inserted to the corresponding open ends of the U-shaped helix 80 so as to provide a heater unit 81. In this instance, described herein are manners other than the common structure since there is much in common at the steps 1~9 when making the heater resistor 32 by the ceramic material in the context of the structure and the manufacturing process.

Figure 13:
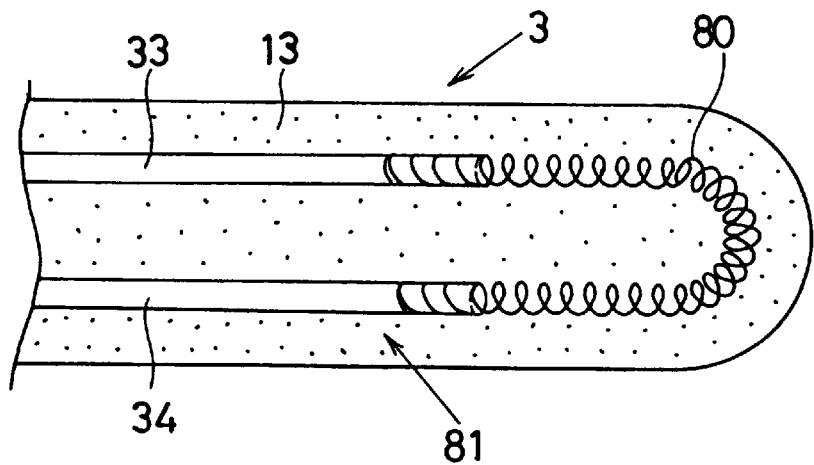
Figure 14:
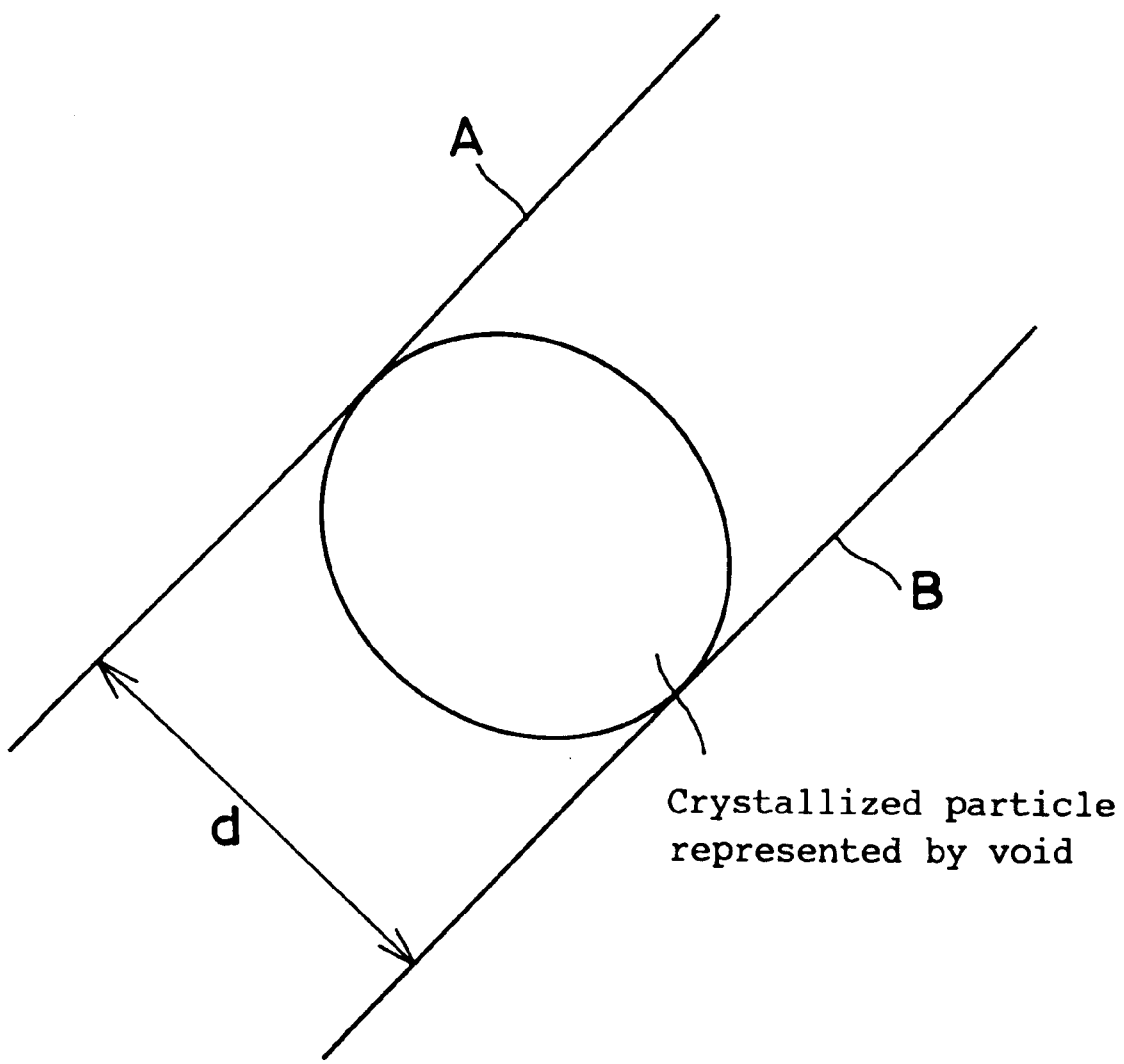
FIG. 14 is a schematic view showing how a granular diameter of $MoSi_2$ particles is defined.
Figure 15:
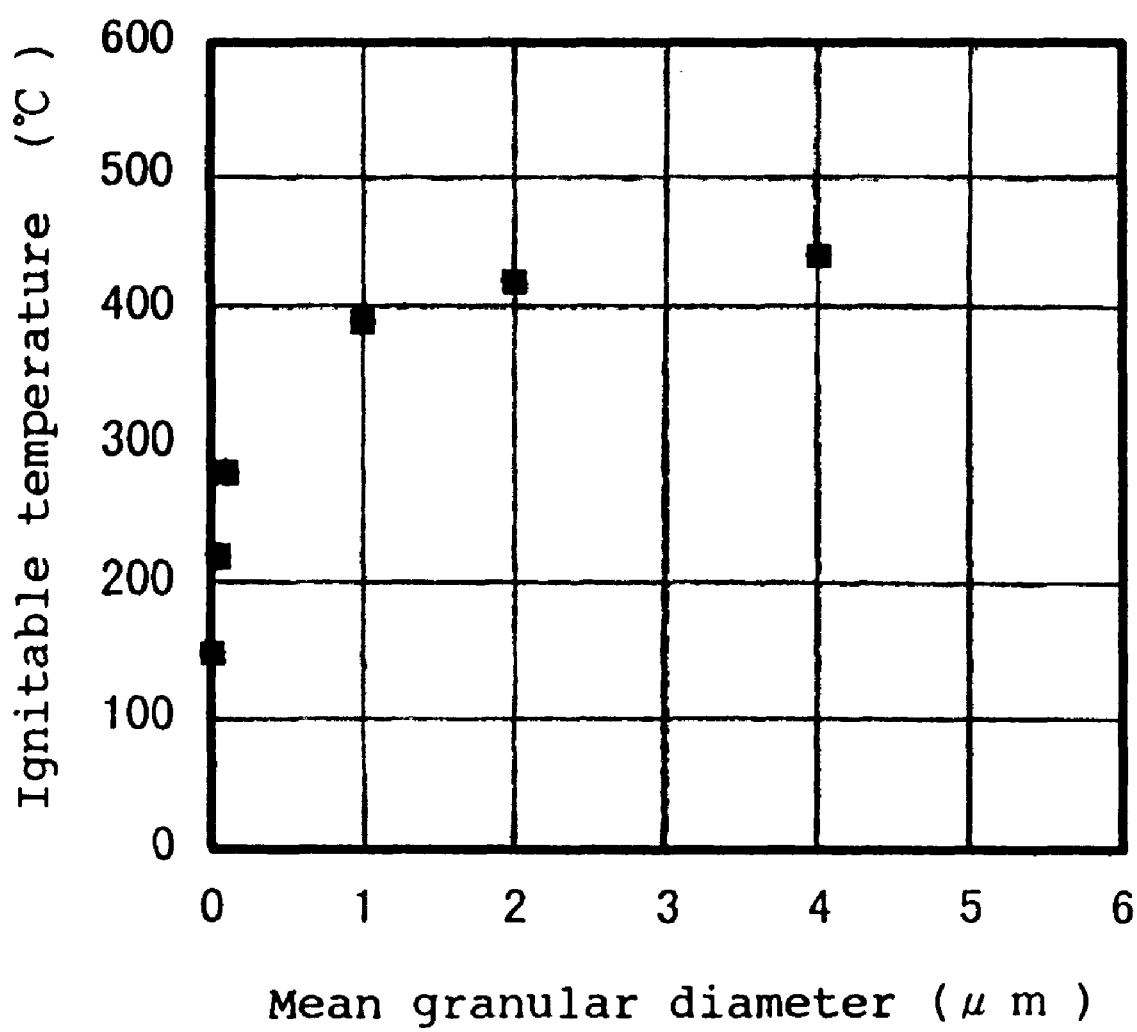
FIG. 15 is a graphical representation showing a relationship between a mean granular diameter of $MoSi_2$ particles and its ignitable temperature.

In lieu of the non-sintered heater resistor 36 (FIG. 7), the heater unit 81 is located within the recess 39 of the split type preform compacts 37, 38 which are pressed to form the composite compact body 306. Then, the composite compact body 306 is hot pressed to provide the ceramic heater in which the heater resistor 32 (in the form of metal wire) is embedded in the basal ceramic body as shown in FIG. 13.

It is noted that the ceramic heater can be applied to not only the glow plug but also a burner igniter, a heating element of an oxygen sensor or the like.

In order to complete the assemble of the glow plug (A), the other ends 332, 342 of the lead wires 33, 34 are soldered to the metal sheath 1 and the metal cap 52, and the rear section 11 of the metal sheath 1 is silver soldered to an inside 20 of the front section 20 of the metal shell 2. Then, the terminal electrode 4 is fastened to the metal shell 2 by way of the insulator ring 61 and the nut 62.

An energization endurance experimental test, heat-and-cool cycle endurance experimental test and three-point bending strength test at room temperature were carried out. In this instance, several types of the ceramic heaters were prepared in accordance with FIG. 2 by using the thermal expansion moderating $MoSi_2$ and the sintering aid ($Er_2O_3$ or $Y_2O_3$).

The containing amount of each constituent is surmized on the basis of the ceramic material of the ceramic heater element. Upon carrying out the energization endurance experimental test by applying 10000 cycles (maximum) to the ceramic heater 3 (①~⑦ five each) and the comparative ceramic heater (①~⑥ five each) with one minute energization (1400° C. as saturated temperature) to one minute deenergization as one cycle.

TABLE 1

| | | constituent (wt %) | | | experimental test results | | |
|---|---|---|---|---|---|---|---|
| | | | oxide of rare | | granular dia. | energization endurance experimental test (on and off each | outer |
| | | $Si_3N_4$ | earth metals | $MoSi_2$ | ($\mu$m) of $MoSi_2$ | for one minute at 1400° C.) | appearance |
| embodiment No. | ① | 88.0 | $Er_2O_3$ 8.0 | 4.0 | 3.0 | nothing wrong at 10000 cycles (n = 5) | nothing abnormal |
| | ② | ↑ | ↑ | ↑ | 2.0 | " | " |
| | ③ | ↑ | ↑ | ↑ | 1.0 | " | " |
| | ④ | ↑ | ↑ | ↑ | 0.5 | " | " |
| | ⑤ | ↑ | ↑ | ↑ | 0.3 | " | " |
| | ⑥ | ↑ | ↑ | ↑ | 0.1 | " | " |
| | ⑦ | ↑ | $Yb_2O_3$ 8.0 | ↑ | 3.0 | " | " |
| comparative counterpart No. | ① | 88.0 | $Er_2O_3$ 8.0 | 4.0 | 10.0 | no good at cycles of 5,9,10,20 and 3 | broken |
| | ② | ↑ | ↑ | ↑ | 8.0 | no good at cycles of 8,9,23,80 and 4 | " |
| | ③ | ↑ | ↑ | ↑ | 6.0 | no good at cycles of 101,30,53,98 and 22 | " |
| | ④ | ↑ | ↑ | ↑ | 4.0 | no good at cycles of 80,202,115,180 and 340 | cracks |
| | ⑤ | ↑ | ↑ | ↑ | 3.5 | no good at cycles of 523,803,705,334 and 853 | " |
| | ⑥ | ↑ | $Yb_2O_3$ 8.0 | ↑ | 3.5 | no good at cycles of 602,866,576,298 and 623 | " |

As evident from Table 1, it was found in the ceramic heater 3 (①~⑦ five pieces each) that no fracture or crack was perceived during the 10000-cycle energization endurance experimental test.

In the comparative ceramic heater (①~⑥ five pieces each), the cross sectional observation shows that the ceramic fractures or cracks surmisingly appeared with the result that the basal ceramic body became short of the sufficient strength to resist the thermal stress induced between the particles and the ambient phase due to the emergence of relatively great granular diameter of the constituents.

Upon carrying out the heat-and-cool cycle endurance experimental test, the ceramic heater is placed in an electric furnace and is subjected repeatedly to the heat and cool cycles 500 times between 400~900° C. in accordance with a programmed control. After the end of the heat-and-cool cycle endurance experimental test, the basal ceramic body was cut into halves, outer surfaces of which are polished to observe by means of an optical microscope.

TABLE 2

| | | constituent (wt %) | | | | experimental test results | | |
|---|---|---|---|---|---|---|---|---|
| | | | oxide of rare | | granular dia. | energization endurance experimental test (on and off each for one | outer | heat and cool cycle experimental |
| | | $Si_3N_4$ | earth metal | $MoSi_2$ | ($\mu$m) of $MoSi_2$ | minute at 1400° C.) | appearance | test (400~900° C.) |
| embodiment No. | ⑪ | 87.0 | $Er_2O_3$ 7.0 | 6.0 | 2.0 | nothing wrong at 10000 cycles (n = 5) | nothing abnormal | appreciable pores |
| | ⑫ | 87.5 | 7.5 | 5.0 | ↑ | nothing wrong at 10000 cycles (n = 5) | nothing abnormal | sporadic pores |
| | ⑬ | 88.0 | 8.0 | 4.0 | ↑ | nothing wrong at 10000 cycles (n = 5) | nothing abnormal | good without pores |
| | ⑭ | 88.5 | 8.5 | 3.0 | ↑ | nothing wrong at 10000 cycles (n = 5) | nothing abnormal | " |
| | ⑮ | 89.0 | 9.0 | 2.0 | ↑ | nothing wrong at 10000 cycles (n = 5) | nothing abnormal | " |
| | ⑯ | 89.5 | 9.5 | 1.0 | ↑ | nothing wrong at 10000 cycles (n = 5) | nothing abnormal | " |
| | ⑰ | 90.0 | 9.5 | 0.5 | ↑ | nothing wrong at 10000 cycles (n = 5) | nothing abnormal | " |

As shown from the experimental test results of Table 2, the minute pores were perceived due to the oxide formation and its sublimation in the comparative ceramic heater which surmisingly contains $MoSi_2$ particles by 5.0% or more by weight. On the other hand, no pore was recognized in the ceramic heater of the present invention which contains $MoSi_2$ by 1.0~5.0% by weight. Upon carrying out the three-point bending strength test at room temperature, the ceramic heaters of the present invention were used as test pieces in conformity with JISR 1601.

TABLE 3

| embodiment No. | constituent (wt %) | | | granular dia. (μm) of MoSi$_2$ | three-point bending strength (Mpa) | estimation |
| --- | --- | --- | --- | --- | --- | --- |
| | Si$_3$N$_4$ | oxide of rare earth metal | MoSi$_2$ | | | |
| ㉑ | 88.0 | Er$_2$O$_3$ 7.0 | 4.0 | 0.1 | 1480 | ◉ |
| ㉒ | ↑ | ↑ | ↑ | 0.3 | 1490 | ◉ |
| ㉓ | ↑ | ↑ | ↑ | 0.5 | 1520 | ◉ |
| ㉔ | ↑ | ↑ | ↑ | 1.0 | 1500 | ◉ |
| ㉕ | ↑ | ↑ | ↑ | 2.0 | 1550 | ◉ |
| ㉖ | ↑ | ↑ | ↑ | 2.5 | 1490 | ◉ |
| ㉗ | ↑ | ↑ | ↑ | 2.8 | 1250 | ○ |
| ㉘ | ↑ | ↑ | ↑ | 3.0 | 1200 | ○ |
| ㉙ | ↑ | ↑ | ↑ | 3.5 | 1000 | Δ |

As taught from Table 3, it was found that the three-point bending strength had reduced in the ceramic heater which contains the granular diameter of the MoSi$_2$ particles exceeding 3.0 μm. In Table 3, the legend ◉ shows when the three-point bending strength is 1400 MPa. The legend ○ indicates when the three-point bending strength is 1200 MPa or more but not exceeding 1400 MPa. The legend Δ shows when the three-point bending strength is less than 1200 MPa.

Figure 16:
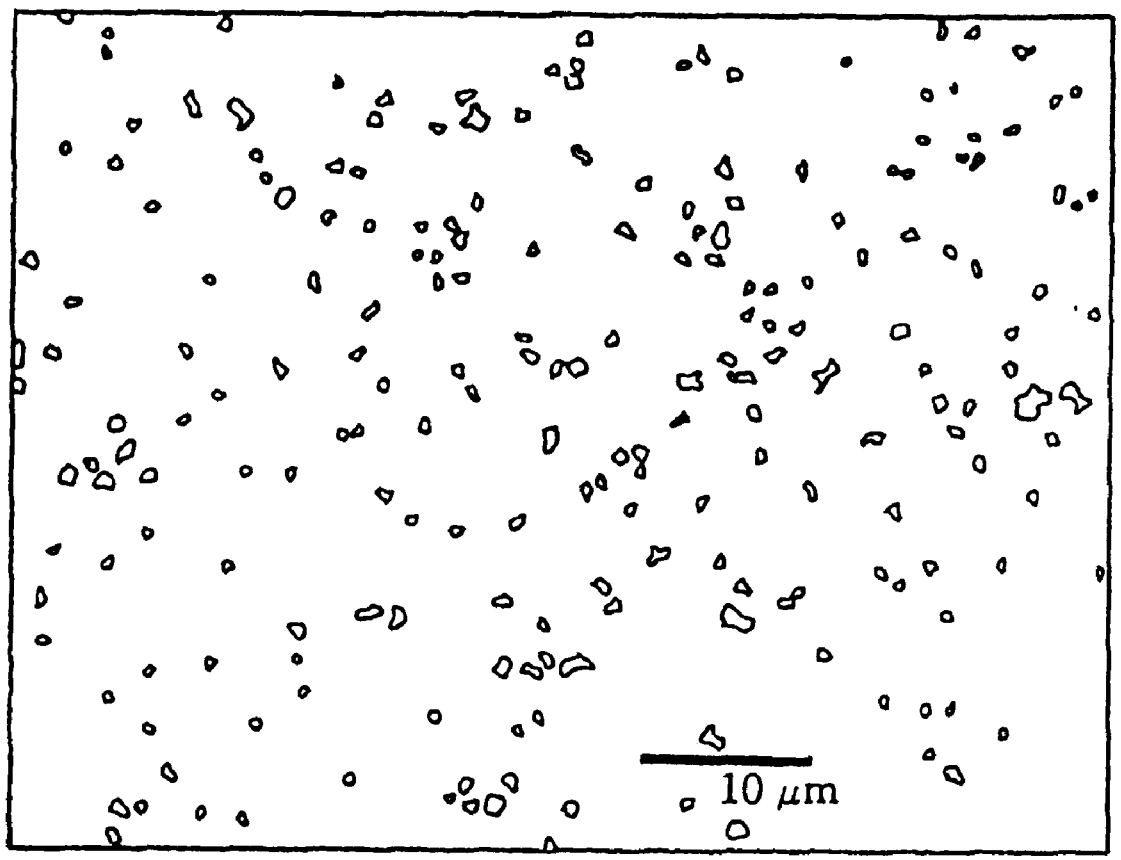
FIG. 16 is a schematic depiction showing a cross sectional texture of a basal ceramic body of the ceramic heater.

FIG. 16 shows a schematic depiction showing cross sectional texture of the basal ceramic body according to the second example ② of the ceramic heater (magnifying power affixed in the Figure). Upon observing the cross sectional texture of the basal ceramic body, it is generally recognized that the MoSi$_2$ particles are evenly dispersed in the basal ceramic body.

As understood from the foregoing description, upon making the ceramic heater 3, the Si$_3$N$_4$ powder, the oxide of the rare earth metals and the MoSi$_2$ particles (granular diameter: 0.1~3.0 μm) are mixed in accordance with the examples ①~⑦ of Table 1. The mixture is wet pulverized and further mixed with the addition of the binder by means of spray dry. The heater resistor (FIGS. 7 and 8) is embedded in the mixture and hot pressed by means of the press machine.

By preparing the granular diameter of MoSi$_2$ particles to be 3.0 μm or less, it is possible to set the physical strength of the Si$_3$N$_4$ based ceramic body more than the thermal stress when subjecting to the sintering process, the repetitive heat-and-cool cycles and energization heat due to the thermal expansional difference between MoSi$_2$ and the Si$_3$N$_4$ based ceramic body. This makes it possible to insure the good energization endurance property without let and hindrance. However, it is inappropriate to prepare the granular diameter of MoSi$_2$ particles to be less than 0.1 μm since it does not contribute to reinforcing the physical strength of the Si$_3$N$_4$ based ceramic body, but only results in an increase in the material cost.

It is to be observed that the metal shell 2 and the metal sheath 1 may be integrally made each other.

I claim:

1. A ceramic heater comprising:
    a heating element embedded in a basal ceramic body, said ceramic body being prepared with silicon nitride as a main constituent;
    MoSi$_2$ particles dispersed throughout said basal ceramic body, said MoSi$_2$ particles having a granular diameter ranging from 0.1 μm up to but not including 3.0 μm; and
    said MoSi$_2$ particles ranging from 1.0% to 5.0% by weight.

2. A ceramic heater according to claim 1, wherein the granular diameter of said MoSi$_2$ particles ranges from 1.0 μm to 2.5 μm in said basal ceramic body in which said heater is embedded.

3. A ceramic heater according to claim 2, wherein said MoSi$_2$ particles ranges from 1.0% to 5.0% by weight contained in said basal ceramic body in which said heater is embedded.

4. A ceramic heater according to claim 3, wherein said heating element is primarily composed of a silicide, carbide or nitride of one or more metals selected from the group consisting of W, Ta, Nb, Ti, Zr, Hf, V, Mo and Cr.

5. A ceramic glow plug in which said ceramic heater according to claim 3 is fixed by a sheath which is supported within a metal shell.

6. A ceramic heater according to claim 2, wherein said MoSi$_2$ particles ranges from 3.0% to 4.0% by weight contained in said basal ceramic body in which said heater is embedded.

7. A ceramic heater according to claim 6, wherein said heating element is primarily composed of silicide, carbide or nitride of one or more metals selected from the group consisting of W, Ta, Nb, Ti, Zr, Hf, V, Mo and Cr.

8. A ceramic glow plug in which said ceramic heater according to claim 6 is fixed by a sheath which is supported within a metal shell.

9. A ceramic heater according to claim 2, wherein said heater is prepared mainly by silicide, carbide or nitride of one or more metals selected from the group consisting of W, Ta, Nb, Ti, Zr, Hf, V, Mo and Cr.

10. A ceramic glow plug in which said ceramic heater according to claim 2 is fixed by a sheath which is supported within a metal shell.

11. A ceramic heater according to claim 1, wherein said MoSi$_2$ particles range from 3.0% to 4.0% by weight.

12. A ceramic heater according to claim 11, wherein said heating element is primarily composed of a silicide, carbide or nitride of one or more metals selected from the group consisting of W, Ta, Nb, Ti, Zr, Hf, V, Mo and Cr.

13. A ceramic glow plug in which said ceramic heater according to claim 11 is fixed by a sheath which is supported within a metal shell.

14. A ceramic heater according to claim 1, wherein said heating element is primarily composed of a silicide, carbide or nitride of one or more metals selected from the group consisting of W, Ta, Nb, Ti, Zr, Hf, V, Mo and Cr.

15. A ceramic glow plug in which said ceramic heater according to claim 9 is fixed by a sheath which is supported within a metal shell.

16. A ceramic glow plug in which said ceramic heater according to claim 3 is fixed by a sheath which is supported within a metal shell.

17. A ceramic glow plug in which said ceramic heater according to claim 1 is fixed by a sheath which is supported within a metal shell.

18. A method of making a ceramic heater comprising the steps of:

mixing $Si_3N_4$ particles and $MoSi_2$ particles with an addition of an oxide of a rare earth metal as a sintering aid so as to prepare a basal ceramic body, granular diameter of said $MoSi_2$ particles ranging from 0.1 $\mu$m to 3.0 $\mu$m and ranging from 1.0% to 5.0% by weight contained in said $Si_3N_4$ particles, $MoSi_2$ particles and said oxide of the rare earth metal;

embedding in said basal ceramic body a heating element, said heating element being primarily composed of a silicide, carbide or nitride of one or more metals selected from the group consisting of W, Ta, Nb, Ti, Zr, Hf, V, Mo and Cr; and sintering said basal ceramic body by means of hot press procedure in which said heating element is embedded.

19. A ceramic heater comprising:

a heating element embedded in a basal ceramic body, said ceramic body being prepared with silicon nitride as a main constituent; and $MoSi_2$ particles dispersed throughout said basal ceramic body, said $MoSi_2$ particles having a granular diameter ranging from 2.5 $\mu$m up to but not including 3.0 $\mu$m. said $MoSi_2$ particles ranging from 1.0% to 5.0% by weight.

* * * * *